United States Patent
Reinlein et al.

(10) Patent No.: US 11,881,745 B2
(45) Date of Patent: Jan. 23, 2024

(54) STATOR OF AN ELECTRIC MACHINE, METHOD FOR PRODUCING SAME AND ELECTRIC MACHINE

(71) Applicant: Dr. Ing. h.c. F. Porsche Aktiengesellschaft, Stuttgart (DE)

(72) Inventors: Michael Reinlein, Nuremberg (DE); Thomas Hubert, Leonberg (DE)

(73) Assignee: DR. ING. H.C. F. PORSCHE AKTIENGESELLSCHAFT

( * ) Notice: Subject to any disclaimer, the term of this patent is extended or adjusted under 35 U.S.C. 154(b) by 0 days.

(21) Appl. No.: 17/741,478

(22) Filed: May 11, 2022

(65) Prior Publication Data
US 2022/0376565 A1  Nov. 24, 2022

(30) Foreign Application Priority Data
May 19, 2021  (DE) .................. 10 2021 112 931.1

(51) Int. Cl.
*H02K 1/16* (2006.01)
*H02K 3/487* (2006.01)
*H02K 15/02* (2006.01)

(52) U.S. Cl.
CPC ............. *H02K 1/165* (2013.01); *H02K 3/487* (2013.01); *H02K 15/024* (2013.01)

(58) Field of Classification Search
CPC ........ H02K 1/165; H02K 15/024; H02K 3/48; H02K 3/487
See application file for complete search history.

(56) References Cited

U.S. PATENT DOCUMENTS

| | | | | |
|---|---|---|---|---|
| 3,213,302 | A | * | 10/1965 | Barney ................... C23C 22/74 148/245 |
| 3,213,306 | A | * | 10/1965 | Summers .............. H02K 17/165 29/598 |
| 4,755,698 | A | | 7/1988 | Frister et al. |
| 8,866,362 | B2 | * | 10/2014 | Bagepalli ............... H02K 21/12 310/216.019 |
| 8,887,377 | B2 | * | 11/2014 | Hasegawa ................ H02K 1/16 310/216.004 |

(Continued)

FOREIGN PATENT DOCUMENTS

| | | |
|---|---|---|
| DE | 3608472 A1 | 9/1987 |
| DE | 10242404 A1 | 3/2004 |

(Continued)

OTHER PUBLICATIONS

JP-2010239721-A, Ishigami, all pages (Year: 2010).*
(Continued)

*Primary Examiner* — Naishadh N Desai
(74) *Attorney, Agent, or Firm* — LEYDIG, VOIT & MAYER, LTD.

(57) ABSTRACT

A stator of an electric machine includes: a laminated stator core having sheet-metal blanks which have apertures, the apertures being closed radially on an inside thereof by a web when viewed in a cross section extending in a radial direction of the stator; and stator windings, which are accommodated in the apertures of the laminated stator core. The web which closes a respective aperture radially on the inside is plastically deformed so as to introduce a mechanical stress into the web.

20 Claims, 2 Drawing Sheets

(56) References Cited

U.S. PATENT DOCUMENTS

| | | | |
|---|---|---|---|
| 2003/0030350 A1* | 2/2003 | Lee | H02K 15/0018 |
| | | | 29/596 |
| 2003/0201687 A1 | 10/2003 | Asai | |
| 2015/0001984 A1 | 1/2015 | Bradield | |
| 2015/0008785 A1* | 1/2015 | Mori | H02K 3/522 |
| | | | 310/216.069 |
| 2017/0294812 A1* | 10/2017 | Nakano | H02K 1/16 |
| 2018/0233969 A1 | 8/2018 | Chaillou et al. | |

FOREIGN PATENT DOCUMENTS

| | | | | |
|---|---|---|---|---|
| DE | 102017211452 A1 | | 1/2019 | |
| JP | 2000224788 A | | 8/2000 | |
| JP | 2002153029 A | | 5/2002 | |
| JP | 2005027437 A | | 1/2005 | |
| JP | 2006101629 A | | 4/2006 | |
| JP | 2007295764 A | | 11/2007 | |
| JP | 2010239721 A | * | 10/2010 | |
| JP | 2010239721 A | | 10/2010 | |
| JP | 2015082941 A | * | 4/2015 | ............ H02K 1/243 |
| JP | 2016171652 A | | 9/2016 | |
| JP | 2018174644 A | | 11/2018 | |

OTHER PUBLICATIONS

JP-2015082941-A, Tokizawa, all pages (Year: 2015).*
M. Oechsner, et al., "E1 Werkstoff-und Bauteileigenschaften", Taschenbuch für den Maschinenbau, Dec. 2019, pp. E2-E3, vol. 25, Springer, Berlin, Germany.
Achim Kampker, "Der Produltionsprozess des Motors", Elektromobilproduktion, Dec. 2014, pp. 141-147, Springer, Berlin, Germany.

* cited by examiner

STATOR OF AN ELECTRIC MACHINE, METHOD FOR PRODUCING SAME AND ELECTRIC MACHINE

CROSS-REFERENCE TO PRIOR APPLICATION

Priority is claimed to German Patent Application No. DE 10 2021 112 931.1, filed on May 19, 2021, the entire disclosure of which is hereby incorporated by reference herein.

FIELD

The invention relates to a stator of an electric machine, to an electric machine having a stator and to a method for producing the stator.

BACKGROUND

The fundamental construction of an electric machine is known from practical experience. Thus, an electric machine has a stator, which has a housing, a laminated stator core and stator windings with winding overhangs. The stator is also referred to in German as a "Ständer" (=Engl. stator). Furthermore, an electric machine has a rotor, which has a rotor shaft and a laminated rotor core. The rotor is also referred to in German as a "Läufer" (=Engl. rotor).

The laminated stator core of a stator of an electric machine is composed of a plurality of sheet-metal blanks, wherein the sheet-metal blanks have apertures which accommodate the stator windings of the stator.

These apertures are typically slots, which are open radially on the inside, adjacent to the rotor of the electric machine. Thus US 2015/0 001 984 A1, US 2017/0 294 812 A1, furthermore US 2018/0 233 969 A1, US 2003/0 030 350 A1, US 2015/0 008 785 A1, DE 36 08 472 A1, DE 10 2017 211 452 A1 and JP 2010-239 721 A each disclose stators of an electric machine having a laminated stator core and stator windings, wherein the stator windings are positioned in slot-like apertures of the laminated stator core which are open radially on the inside.

US 2003/0 201 687 A1 shows a stator of an electric machine having a laminated stator core and stator windings which are accommodated in apertures of the laminated stator core. The apertures are designed in such a way that they are closed radially on the inside by means of a web when viewed in a cross section extending in the radial direction of the stator.

During the operation of an electric machine, so-called bearing currents can form, bearing currents being electrical currents which flow via the bearing. This can lead to material changes in the bearing, thereby ultimately possibly causing failure of the bearing. There is a need to reduce the risk of bearing currents, specifically with the electric machine continuing, as before, to have a high power density.

SUMMARY

In an embodiment, the present invention provides a stator of an electric machine, comprising: a laminated stator core comprising sheet-metal blanks which have apertures, the apertures being closed radially on an inside thereof by a web when viewed in a cross section extending in a radial direction of the stator; and stator windings, which are accommodated in the apertures of the laminated stator core, wherein the web which closes a respective aperture radially on the inside is plastically deformed so as to introduce a mechanical stress into the web.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
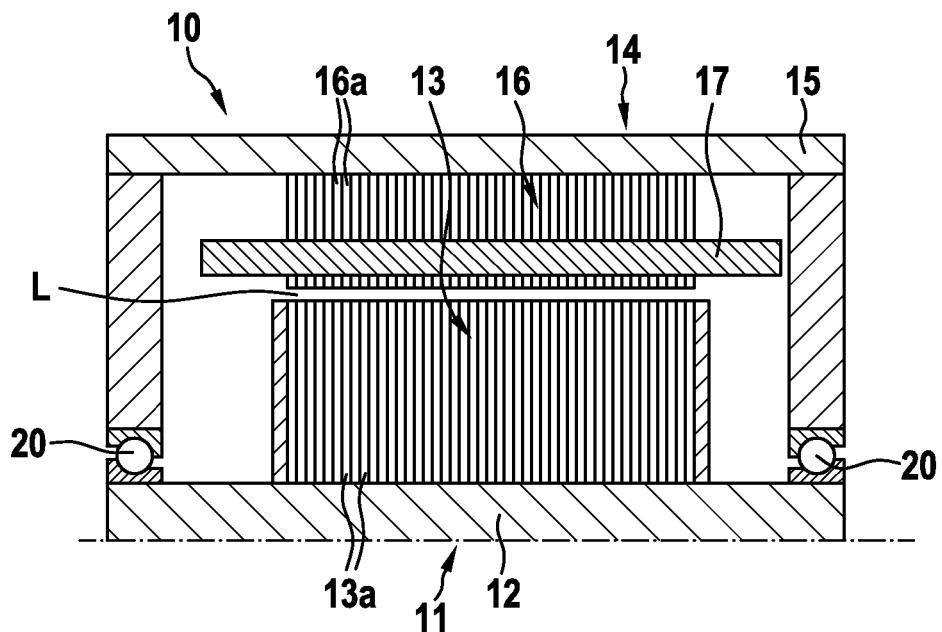
FIG. 1 shows a cross section through an electric machine.

In an embodiment, the present invention provides a novel stator of an electric machine, an electric machine having such a stator and a method for producing such a stator.

In an embodiment, the present invention provides a stator of an electric machine as described herein.

The stator has a laminated stator core consisting of sheet-metal blanks which have apertures, wherein the apertures are closed radially on the inside by means of a web extending in the circumferential direction when viewed in a cross section extending in the radial direction of the stator. Furthermore, the stator has stator windings, which are accommodated in the apertures of the laminated stator core. The web which closes the respective aperture radially on the inside is plastically deformed in such a way that a mechanical stress is introduced into the latter.

By virtue of the fact that, in the stator according to the invention, the apertures of the laminated stator core which accommodate the stator windings are closed radially on the inside by a web radially on the inside, the risk of bearing currents is already reduced. As a result of the plastic deformation of these webs and the introduction of mechanical stresses into the latter, the magnetic properties of the laminated stator core in the region of the webs are impaired, thereby making it possible to effectively counteract the formation of bearing currents, while the electric machine has a high power density.

A mechanical stress which is greater than the yield strength of the material of the web is preferably introduced into the web which closes the respective aperture radially on the inside. This development is particularly preferred in order to counteract the formation of bearing currents, while the electric machine has a high power density.

Free spaces between the plastically deformed webs of sheet-metal blanks that are adjacent in the axial direction are preferably filled with an insulating baked enamel or adhesive that connects the sheet-metal blanks. This development is also preferred in order to counteract the formation of bearing currents, while the electric machine has a high power density.

The webs are preferably plastically deformed in the axial direction of the laminated stator core with a reduction in the thickness of the sheet-metal blanks, at least in some section or sections, in the region of the respective web. By this means, too, the formation of bearing currents can be effectively counteracted while, at the same time, the electric machine has a high power density.

The electric machine is described herein and the method for producing the stator is described herein.

Preferred developments of the invention will be found in the following description. Exemplary embodiments of the invention are explained in greater detail with reference to the drawing, without being limited thereto. In the drawing:

FIG. 1 shows a highly schematic cross section of the basic construction of an electric machine 10.

The electric machine 10 has a rotor 11 having a rotor shaft 12 and a laminated rotor core 13 arranged on the rotor shaft 12. The electric machine 10 furthermore has a stator 14 having a housing 15, a laminated stator core 16 and having stator windings 17 accommodated by the laminated stator core 16. The rotor shaft 12 is rotatably mounted in the housing 15 by means of bearings 20.

Figure 2:
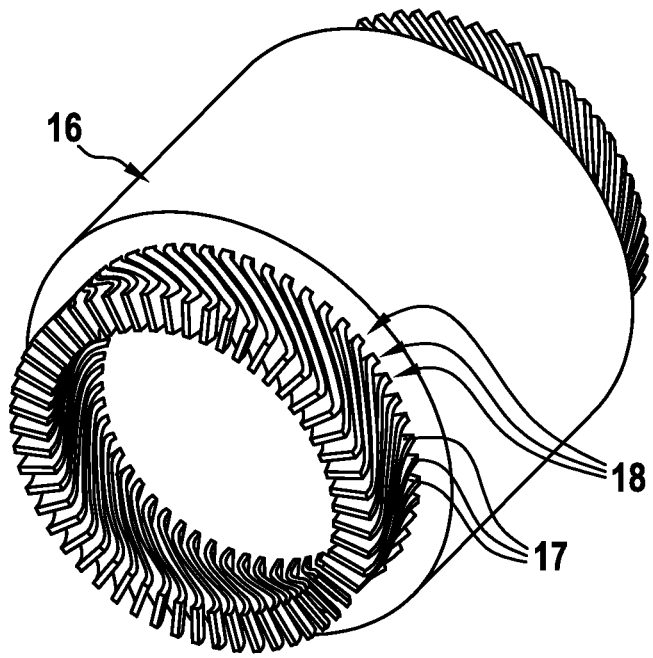
FIG. 2 shows a perspective view of the stator of the electric machine.

FIG. 2 shows a perspective arrangement of a laminated stator core 16 together with stator windings 17 accommodated in the laminated stator core 16, wherein, according to FIGS. 1 and 2, the stator windings 17 protrude relative to the laminated stator core 16 on both sides of the latter. At these sections of the stator windings 17 protruding with respect to the laminated stator core 16, the stator windings 17 are connected to one another to form so-called winding overhangs.

The laminated stator core 16 is composed of sheet-metal blanks 16a, and the laminated rotor core 13 is likewise composed of sheet-metal blanks 13a.

The sheet-metal blanks 16a, and thus the laminated stator core 16, have apertures 18, which serve to accommodate the stator windings 17. In the case of the stator 14 according to the invention, these apertures 18 are completely closed radially on the inside, when viewed in a cross section extending in the radial direction of the stator 14, by means of a web 19 extending in the circumferential direction. Each of the apertures 18 is delimited on all sides by the respective sheet-metal blank 16a of the laminated core 16 when viewed in a cross section extending in the radial direction and is thus enclosed, and accordingly the apertures 18 are therefore open only at axial ends, by means of which the stator windings 17 can be introduced into the apertures 18 in the axial direction of the stator 14.

In the cross section of FIG. 1, the axial direction of the stator 14 and thus of the laminated stator core 16 of the electric machine 10 extends in the horizontal direction in the plane of the drawing of FIG. 1. In the plane of the drawing in FIG. 3, the axial direction of the stator 14 and thus of the laminated stator core 16 of the electric machine 10 extends perpendicular to the plane of the drawing in FIG. 3. The radial direction of the stator 14 and thus of the laminated stator core 16 of the electric machine 10 extends in the vertical direction in the plane of the drawing in FIG. 1, and in the horizontal and vertical direction in the plane of the drawing in FIG. 3. The cross section of FIG. 1 can accordingly also be designated as a cross section extending in the axial direction of the stator 14. A cross section extending in the radial direction of the stator 14 would correspond to FIG. 3.

Figure 3:
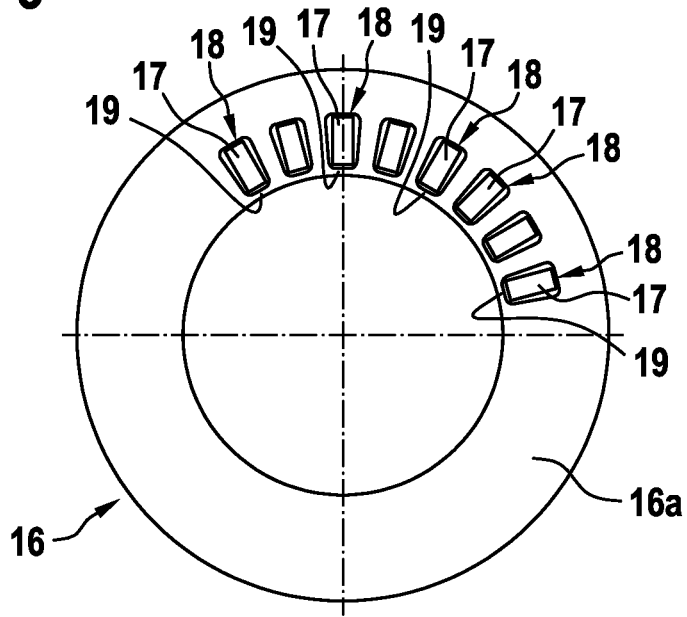
FIG. 3 shows a simplified front view of the stator of the electric machine.
Figure 4:
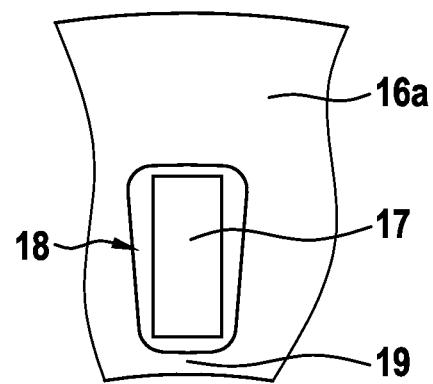
FIG. 4 shows a detail of FIG. 3.

FIG. 3 does not show all the apertures 18. There are further apertures adjoining in the circumferential direction on both sides of the apertures 18 shown in FIG. 3.

In the case of the stator 14 according to the invention, the webs 19 which close the apertures 18 radially on the inside are plastically deformed, more specifically in such a way that a mechanical stress is introduced into the apertures. In this way, it is possible to counteract the formation of bearing currents, while the power density is high.

A mechanical stress which is greater than the yield strength of the material of the web 19 and thus of the material of the sheet-metal blank 16a of the laminated stator core 16 is introduced into the respective web 19 which delimits the respective aperture 18 radially on the inside and closes it radially on the inside.

In the process, the webs 19 are plastically deformed, as seen in the axial direction of the laminated stator core 16, more specifically at least with a reduction in an axial thickness of some section or sections of the respective sheet-metal blank 16a in the region of the respective web 19.

When the sheet-metal blanks 16a of the laminated stator core 16 are stacked in the axial direction of the laminated stator core 16 and rest flat against one another, small gaps or free spaces can thus be formed between the sheet-metal blanks 16a in the region of the webs 19 plastically deformed in the axial direction, but these gaps or free spaces are filled either with insulating baked enamel or with adhesive, which serves to connect the sheet-metal blanks 16a to form the laminated stator core 16.

The invention relates not only to the stator 14 but also to the electric machine 10, which comprises the stator 14 and the rotor 11. The stator 14 is embodied as described above.

The invention furthermore relates to a method for producing the stator 14. In this case, the procedure is such that metal sheets are first provided and the apertures 18 are punched out of the metal sheets prepared in order to form the sheet-metal blanks 16a.

When the metal sheets are punched to form the sheet-metal blanks 16a, the webs 19 which delimit and close the apertures 18 for accommodating the stator windings 17 radially on the inside remain behind. Radially on the inside, the webs 19 of the laminated stator core 16 adjoin the laminated rotor core 13, forming an air gap L between the laminated rotor core 13 and the laminated stator core 16.

The webs 19 of the sheet-metal blanks 16a are plastically deformed. The plastic deformation of the webs 19 can take place at the same time as the punching of the apertures 18 or at a later time. For the plastic deformation of the webs 19, a punch can be used which deforms the webs 19 in the axial direction.

After the production of the sheet-metal blanks 16a with the punched-out apertures 18 and the webs 19 plastically deformed in the axial direction, a defined number of sheet-metal blanks 16a is arranged to form a stack, this stack of sheet-metal blanks 16a being pressed and connected to form the laminated stator core 16.

The stator windings 17 are then arranged in the apertures 18 of the sheet-metal blanks 16a connected to form the laminated stator core 16.

The risk of bearing currents and the risk of bearing failure as a result of bearing currents is reduced with the aid of the invention.

Radially on the inside, each aperture 18 which serves to accommodate a stator winding 17 is closed by means of a respective web 19. These webs 19 are plastically deformed. As a result, the magnetic properties of the laminated stator core 16 in the region of the webs 19 are impaired.

The propagation of eddy current paths in the axial direction is counteracted by the lamination and insulating layers between the sheet-metal blanks 16a.

Ultimately, the formation of bearing currents can be counteracted while, at the same time, the electric machine 10 has a high power density.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A stator of an electric machine, comprising:
   a laminated stator core comprising sheet-metal blanks which have apertures, the apertures being closed radially on an inside thereof by a web when viewed in a cross section extending in a radial direction of the stator; and
   stator windings, which are accommodated in the apertures of the laminated stator core,
   wherein the web which closes a respective aperture radially on the inside is plastically deformed so as to introduce a mechanical stress into the web.

2. The stator of claim 1, wherein the mechanical stress is greater than a yield strength of a material of the web.

3. An electric machine, comprising:
   a rotor; and
   the stator of claim 1, the stator surrounding the rotor radially on an outside, forming an air gap between the rotor and the stator.

4. A method for producing the stator of claim 1, the method comprising:
   providing metal sheets;
   punching sheet-metal blanks which have apertures out of the metal sheets, the apertures being closed radially on an inside by the web when viewed in the cross section extending in the radial direction of the stator;
   plastically deforming the webs of the sheet-metal blanks;
   arranging a defined number of sheet-metal blanks into a stack;
   pressing and connecting the stack of sheet-metal blanks to form the laminated stator core; and
   arranging the stator windings in the apertures of the sheet-metal blanks connected to form the laminated stator core.

5. The method of claim 4, wherein the punching and plastically deforming are carried out simultaneously.

6. The method of claim 4, wherein the punching and plastically deforming are carried out successively.

7. The method of claim 4, wherein, during the plastically deforming, a thickness of the sheet-metal blanks is reduced, at least in some section or sections, in a region of a respective web in an axial direction of the laminated stator core.

8. A stator of an electric machine, comprising:
   a laminated stator core comprising sheet-metal blanks which have apertures, the apertures being closed radially on an inside thereof by a web when viewed in a cross section extending in a radial direction of the stator; and
   stator windings, which are accommodated in the apertures of the laminated stator core,
   wherein the web which closes a respective aperture radially on the inside is plastically deformed so as to introduce a mechanical stress into the web,
   wherein free spaces between plastically deformed webs of sheet-metal blanks that are adjacent in an axial direction are filled with a baked enamel or adhesive that connects the sheet-metal blanks.

9. The stator of claim 8, wherein the webs are plastically deformed in an axial direction of the laminated stator core with a reduction in a thickness of the sheet-metal blanks, at least in some section or sections, in a region of the respective web.

10. The stator of claim 8, wherein the mechanical stress is greater than a yield strength of a material of the web.

11. An electric machine, comprising:
    a rotor; and
    the stator of claim 8, the stator surrounding the rotor radially on an outside, forming an air gap between the rotor and the stator.

12. A method for producing the stator of claim 8, the method comprising:
    providing metal sheets;
    punching sheet-metal blanks which have apertures out of the metal sheets, the apertures being closed radially on an inside by the web when viewed in the cross section extending in the radial direction of the stator;
    plastically deforming the webs of the sheet-metal blanks;
    arranging a defined number of sheet-metal blanks into a stack;
    pressing and connecting the stack of sheet-metal blanks to form the laminated stator core; and
    arranging the stator windings in the apertures of the sheet-metal blanks connected to form the laminated stator core.

13. The method of claim 12, wherein the punching and plastically deforming are carried out simultaneously.

14. The method of claim 12, wherein, during the plastically deforming, a thickness of the sheet-metal blanks is reduced, at least in some section or sections, in a region of a respective web in an axial direction of the laminated stator core.

15. A stator of an electric machine, comprising:
    a laminated stator core comprising sheet-metal blanks which have apertures, the apertures being closed radially on an inside thereof by a web when viewed in a cross section extending in a radial direction of the stator; and
    stator windings, which are accommodated in the apertures of the laminated stator core,
    wherein the web which closes a respective aperture radially on the inside is plastically deformed so as to introduce a mechanical stress into the web, wherein the webs are plastically deformed in an axial direction of the laminated stator core with a reduction in a thickness of the sheet-metal blanks, at least in some section or sections, in a region of the respective web.

16. The stator of claim 15, wherein the mechanical stress is greater than a yield strength of a material of the web.

17. An electric machine, comprising:
a rotor; and
the stator of claim 15, the stator surrounding the rotor radially on an outside, forming an air gap between the rotor and the stator.

18. A method for producing the stator of claim 15, the method comprising:
providing metal sheets;
punching sheet-metal blanks which have apertures out of the metal sheets, the apertures being closed radially on an inside by the web when viewed in the cross section extending in the radial direction of the stator;
plastically deforming the webs of the sheet-metal blanks;
arranging a defined number of sheet-metal blanks into a stack;
pressing and connecting the stack of sheet-metal blanks to form the laminated stator core; and
arranging the stator windings in the apertures of the sheet-metal blanks connected to form the laminated stator core.

19. The method of claim 18, wherein the punching and plastically deforming are carried out simultaneously.

20. The method of claim 18, wherein, during the plastically deforming, a thickness of the sheet-metal blanks is reduced, at least in some section or sections, in a region of a respective web in an axial direction of the laminated stator core.

* * * * *